May 9, 1950 V. SCHERRER 2,506,687
DEMOUNTABLE VACUUM TUBE
Filed Aug. 2, 1946
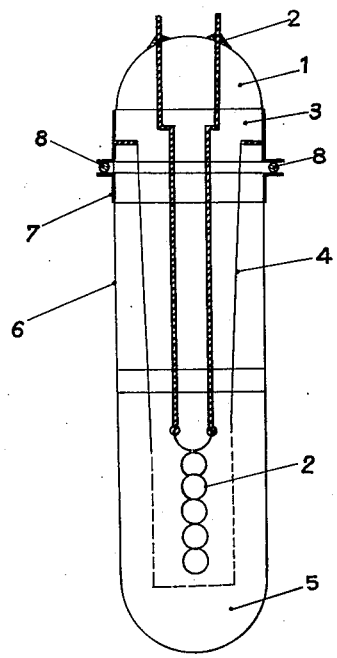
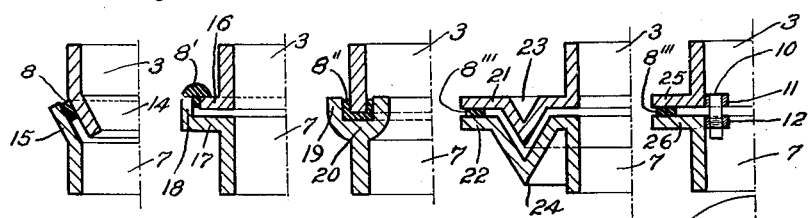
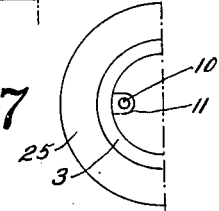
INVENTOR
VADIM SCHERRER
By John A. Brady
Attorney.

UNITED STATES PATENT OFFICE 2,506,687

DEMOUNTABLE VACUUM TUBE

Vadim Scherrer, Paris, France, assignor to Societe Francaise Radio Electrique, a corporation of France Application August 2, 1946, Serial No. 688,035
In France April 27, 1944

Section 1, Public Law 690, August 8, 1946
Patent expires April 27, 1964

3 Claims. (Cl. 250—27.5)

This invention relates to demountable vacuum tubes.

Such high power tubes of this type which have been constructed up to the present time are, either imperfectly air-tight—and consequently they need pumping for sustaining a sufficiently hard vacuum during the working of the tube—or perfectly tight, but with sealed glass joints, the dismantlement of which is not free from great risks incident to the pieces being broken or damaged.

The present invention advocates the utilization of a sealed demountable joint located in the metallic parts of the tube, these metallic parts being previously sealed permanently in the glass material of the tube; also the sealing of the demountable joint may be performed in any manner susceptible of maintaining the vacuum in the interior of the tube. Under these conditions it is possible to effect the demounting without being exposed to the above-mentioned risks.

With reference to the accompanying drawing the following explanations, give, by way of a non limitative example, the description of a tube constructed according to the principle of the invention, as well as various methods for sealing which permit of obtaining a sufficient tightness of the demountable joints.

In the drawings,

Figure 1 is a schematic view showing my invention applied to the sealing of a demountable high powered vacuum tube;

Fig. 2 shows one example of a self-centering sealed joint for a vacuum tube embodying my invention;

Fig. 3 shows a modified form of self-centering sealed joint for vacuum tubes;

Fig. 4 shows a further modification of a sealed joint of the self-centering type applied to a high powered vacuum tube;

Fig. 5 illustrates a further modified form of self-centering joint for the electrodes of a high powered demountable tube constructed in accordance with my invention;

Fig. 6 illustrates a still further modification of the self-centering sealed joint arrangement of my invention; and Fig. 7 is a plan view of the centering means employed in the arrangement illustrated in Fig. 6.

Figure 1 shows a high power triode comprising a glass cup 1 whereto the filament 2 and the circular part 3 of ferro-nickel which supports the grid 4 are fixed and, also the anode 5, the glass portion 6 and a second ring 7 of ferro-nickel sealed to the glass portion 6; the sealed demountable joint 8 is built up between the two rings 3 and 7 of ferro-nickel, by means, for instance, of one or the other of the following methods:

At the place of the joint, there is deposited glass in the form of powder, paste, rods or ring, which is afterwards melted through high frequency energy, or a blow pipe or any other mode of heating.

The glass for the sealing may be advantageously replaced by brazing metal which is worked under appropriate gaseous atmosphere; it is also possible to operate through electric or autogenous welding.

In particular, if copper is used as sealing metal, one or more copper wires of a suitable diameter are placed between the two pieces of ferro-nickel to be assembled, then fusion of copper is effected in a reducing hydrogen atmosphere for instance. For demounting, it will suffice to warm up the joint to a sufficient temperature for fusing the sealing copper.

The geometric forms of the metallic portions united by the demountable sealed joint may be designed in such manner that the centering of the whole and a determined angular position of the electrodes are obtained automatically during the sealing of the joint. Figs. 2, 3, 4, 5 and 6 show examples of embodiments of a centered assembly and at a pin 10 that fixes a determined angular position of the parts.

The sealed joint 8 is provided between the self-centering intersurface connecting means provided by the metallic parts 3 and 7.

In Fig. 2 the frusto-conical end 14 of metallic part 3 projects inwardly in spaced relation to the frusto-conical end 15 of metallic part 7 with the joint of glass 8 sealed therebetween. The frusto-conical portions 14 and 15 serve as self-centering means for spacing the metal parts 3 and 7 accurately with respect to the electrodes within the tube. The parts 3 and 7 mutually support each other. The end portions 14 and 15 extend substantially parallel to each other with the fused joint 8 therebetween.

In Fig. 3 metallic part 3 is provided with flange 16 which extends longitudinally and fits into a laterally extending flange 17 on metal part 7 which has the cylindrical extension 18 which surrounds flange 16 in spaced relation. Metal parts 3 and 7 are thus centered with respect to the electrodes enclosed thereby. The parts are secured in position by means of the fusing means 8'.

In Fig. 4 I have shown metal part 7 as provided with a peripheral annular recessed portion 19 provided with an annular cavity 20 which serves to center metal part 3 and receive the sealing means 8″. Thus the parts 3 and 7 are fixed in a precise spacial relation to the electrodes within the tube.

In Fig. 5 metal parts 3 and 7 are each provided with an outstruck V-shaped peripheral projection formed in annular flange portions 21 and 22 of metal parts 3 and 7 as shown at 23 and 24. The V-shaped annular portions 23 and 24 interfit for centering metallic parts 3 and 7 about the electrodes within the tube. Sealing means 8‴ are provided between the flanges 21 and 22 for establishing a vacuum tight joint.

In the arrangement shown in Figs. 6 and 7 inwardly extending tongues 11 and 12 are provided on the two metallic parts 3 and 7 and pin 10 passes through these aligned tongues 11 and 12 for fixing parts 3 and 7 in a predetermined angular position. The metallic parts 3 and 7 have annular flanges 25 and 26 between which the sealing means 8‴′ is disposed.

Of course, the dispositions of the present invention may be applied to any vacuum container where one or several parts are capable of being demounted.

While I have illustrated my invention in certain preferred embodiments I realize that modifications may be made and I desire that it be understood that no limitations upon my invention are intended other than may be imposed by the scope of the appended claims.

What I claim is:

1. A demountable vacuum tube comprising a multiplicity of spaced concentrically centered electrodes, an envelope enclosing said electrodes, said envelope including at least two portions of glass directed end to end with metallic parts secured to each of the ends of said glass portions and terminating immediately adjacent each other, one of said metallic parts terminating in an outwardly projecting annular flange and having an internally projecting tongue thereon, the other of said metallic parts terminating in an outwardly projecting flange substantially parallel to said first mentioned flange and having an internally directed tongue secured thereto aligned with the aforementioned tongue, a pin extending longitudinally through said tongues substantially parallel with the axes of said metallic parts, and a seal disposed between said flanges.

2. A demountable vacuum tube comprising a multiplicity of spaced concentrically centered electrodes, an envelope enclosing said electrodes, said envelope including at least two portions of glass directed end to end with metallic parts secured to each of the ends of said glass portions and terminating immediately adjacent each other, said metallic parts each terminating in annular flanges projecting outwardly therefrom in substantially parallel spaced relation, a seal disposed between the adjacent faces of said annular flanges, means projecting inwardly from the ends of said metallic parts, and connecting means extending through the aforesaid means for permitting orientation of said metallic parts, one with respect to the other, and effecting assembly and disassembly of said demountable vacuum tube.

3. A demountable vacuum tube comprising a multiplicity of spaced concentrically centered electrodes, an envelope enclosing said electrodes, said envelope including at least two portions of glass directed end to end with metallic parts secured to each of the ends of said glass portions and terminating immediately adjacent each other, said metallic parts each terminating in annular flanges projecting outwardly therefrom in substantially parallel spaced relation, a seal disposed between the adjacent faces of said annular flanges, means projecting inwardly from the ends of said metallic parts, and connecting means secured to the means terminating one of the said metallic parts and penetrating in the means terminating the other of the said metallic parts.

VADIM SCHERRER.

REFERENCES CITED

The following references are of record in the file of this patent:

UNITED STATES PATENTS

| Number | Name | Date |
|---|---|---|
| 1,639,575 | Robinson | Aug. 16, 1927 |
| 1,905,751 | Rankin | Apr. 25, 1933 |
| 2,407,742 | Harries | Sept. 17, 1946 |
| 2,423,066 | Gibson | June 24, 1947 |

FOREIGN PATENTS

| Number | Country | Date |
|---|---|---|
| 469,978 | Great Britain | Aug. 6, 1937 |
| 582,357 | France | Oct. 13, 1924 |